United States Patent
Bailey

(10) Patent No.: US 8,112,987 B2
(45) Date of Patent: Feb. 14, 2012

(54) PROCESS FOR REDUCING NOX EMISSIONS FROM ENGINE EXHAUST USING LNT AND SCR COMPONENTS

(75) Inventor: Owen H. Bailey, Lake Orion, MI (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 614 days.

(21) Appl. No.: 12/201,389

(22) Filed: Aug. 29, 2008

(65) Prior Publication Data
US 2010/0050613 A1    Mar. 4, 2010

(51) Int. Cl.
F01N 3/20    (2006.01)
(52) U.S. Cl. .............. 60/286; 60/288; 60/295
(58) Field of Classification Search ........ 60/286, 60/287, 288, 295, 303
See application file for complete search history.

(56) References Cited

U.S. PATENT DOCUMENTS

| | | | |
|---|---|---|---|
| 5,140,811 A | 8/1992 | Minami et al. |
| 5,603,216 A | 2/1997 | Guile et al. |
| 6,122,909 A | 9/2000 | Murphy et al. |
| 6,178,743 B1 | 1/2001 | Hirota et al. |
| 6,192,675 B1 | 2/2001 | Hirota et al. |
| 6,244,046 B1 | 6/2001 | Yamashita |
| 6,244,047 B1 | 6/2001 | Brehob et al. |
| 6,324,835 B1 | 12/2001 | Surnilla et al. |
| 6,428,754 B1 | 8/2002 | Chang et al. |
| 6,484,495 B2 | 11/2002 | Minami |
| 6,550,240 B2 | 4/2003 | Kolmanovsky et al. |
| 6,615,580 B1 | 9/2003 | Khair et al. |
| 6,718,757 B2 | 4/2004 | Khair et al. |
| 6,823,660 B2 | 11/2004 | Minami |
| 6,959,542 B2 | 11/2005 | Taylor, III et al. |
| 7,021,049 B2 | 4/2006 | Berris et al. |
| 7,047,730 B2 | 5/2006 | Wang et al. |
| 7,062,904 B1 | 6/2006 | Hu et al. |
| 7,062,905 B2 | 6/2006 | Khair et al. |
| 7,213,395 B2 | 5/2007 | Hu et al. |
| 7,673,446 B2 | 3/2010 | Zemskova |
| 2006/0010859 A1 | 1/2006 | Yan et al. |
| 2006/0021331 A1 | 2/2006 | Cizeron et al. |
| 2006/0059896 A1 | 3/2006 | Liu et al. |
| 2006/0260297 A1 | 11/2006 | Koch |
| 2007/0033928 A1* | 2/2007 | Hu et al. .............. 60/286 |
| 2007/0056268 A1 | 3/2007 | McCarthy, Jr. |
| 2008/0155968 A1 | 7/2008 | Salemme et al. |
| 2008/0295499 A1 | 12/2008 | Driscoll et al. |
| 2010/0199634 A1 | 8/2010 | Heaton |

FOREIGN PATENT DOCUMENTS

KR    1998-051022    9/1998

OTHER PUBLICATIONS

Machine Translation of Abstract for KR 1998-051022, 1 pg.

* cited by examiner

*Primary Examiner* — Thomas Denion
*Assistant Examiner* — Jonathan Matthias
(74) *Attorney, Agent, or Firm* — Brooks Kushman P.C.

(57) ABSTRACT

A method of reducing NOx in a vehicle exhaust operating by alternating exhaust flow between two lean NOx traps and directing the emerging exhaust to a downstream SCR catalyst system. While exhaust predominantly flows through one of the lean NOx traps, a reductant is provided to the other NOx trap so as to produce ammonia that is also directed to the SCR catalyst system. An exhaust system implementing the method of the invention is also provided.

16 Claims, 3 Drawing Sheets

PROCESS FOR REDUCING NOX EMISSIONS FROM ENGINE EXHAUST USING LNT AND SCR COMPONENTS

BACKGROUND OF THE INVENTION

1. Field of the Invention

The present invention is related to diesel engine exhaust systems and methods for reducing NOx emissions.

2. Background Art

Numerous system concepts have been developed for optimizing the efficiency and operability of NOx storage catalysts such as lean NOx traps ("LNTs"). Of these, many have also included the combination of LNTs with selective reduction catalysts (SCR). These system concepts take advantage of the ability of LNTs to store NOx and release ammonia ($NH_3$) periodically when the LNT is regenerated under rich conditions. This $NH_3$ is then stored within a downstream SCR catalyst where it is subsequently available for reaction with NOx which slips through the upstream LNT during lean operation.

The key element in this type of exhaust system is having a SCR positioned downstream from an LNT to store ammonia on the SCR. Since the SCR only provides NOx reduction under lean condition and $NH_3$ is only released by the LNT under rich conditions, NOx reduction by the SCR catalyst is limited to conditions where $NH_3$ storage on the SCR catalyst is significant. Because typical SCR catalysts are only able to store significant quantities of $NH_3$ below ~400 C, this means that the SCR catalyst can only complement the NOx performance of the LNT significantly below this temperature. It is possible to separate the SCR catalyst from the LNT by placing the SCR catalyst in a separate converter can. Such a scheme is capable of broadening the effective temperature range of SCR complementation. However, packaging limitations on many applications precludes such separate packaging from being utilized in practice.

Accordingly, there is a need for improved engine exhaust systems and in particular diesel exhaust systems with a greater operating temperature range.

SUMMARY OF THE INVENTION

The present invention solves one or more problems of the prior art by providing in at least one embodiment an engine exhaust system with improved temperature performance. The exhaust system of this embodiment includes a first lean NOx trap, a second lean NOx trap, and a SCR catalyst system. A valve system allows flow through the first lean NOx trap while limiting flow through the second NOx trap and to allow flow through the second lean NOx trap while limiting flow through the first NOx trap. The valve system also regulates the flow of reductants to the first and second NOx traps. A controller operates the valve system in a manner to implement the methods set forth below.

In another embodiment of the present invention, a method of reducing NOx emissions from an engine exhaust and in particular a diesel exhaust is provided. The method of this embodiment comprises flowing a lean exhaust through a first lean NOx trap such that exhaust emerging from the first lean NOx trap flows through an SCR catalyst system. The lean exhaust is then flowed through a second lean NOx trap such that exhaust emerging from the second lean NOx trap flows through the SCR catalyst system. The flow through the first lean NOx trap is reduced when the NOx slippage through the first lean NOx trap is greater than a first predetermined slippage value. A reductant is provided to the first lean NOx trap in a sufficient amount to generate ammonia from the first lean NOx trap when the NOx slippage from the second NOx trap is greater than a second predetermined slippage value. The generated ammonia is directed to the SCR catalyst system such that the ammonia and the exhaust emerging from the second lean NOx trap contemporaneously contact the SCR catalyst system. The lean exhaust is flowed through the first lean NOx trap when ammonia generation from the first lean NOx trap falls below a first predetermined ammonia level. Exhaust emerging from the first lean NOx trap flows through the SCR catalyst system. The flow through the second lean NOx trap is limited and a reductant provided to the second lean NOx trap in a sufficient amount to generate ammonia from the second lean NOx trap when the NOx slippage from the first NOx trap is greater than a second predetermined slippage value. The generated ammonia is directed to the SCR catalyst system such that the ammonia and the exhaust emerging from the first lean NOx trap contemporaneously contact the SCR catalyst system. The lean exhaust is flowed through the second lean NOx trap when ammonia generation from the second lean NOx trap has fallen below a second predetermined ammonia level. Exhaust emerging from second lean NOx trap again flows through the SCR catalyst system. The exhaust flow through the first lean NOx trap is limited. The steps of this embodiment are repeated a plurality of times during operation of an engine. The method of the present embodiment increases the operating temperate range of an LNT+SCR system where both components contribute significantly. Advantageously, the present method allows more NOx to be converted by generating the ammonia and delivering it to the SCR catalyst coincidently with the increased level of NOx slipping through the parallel lean NOx trap. This allows complementation of the lean NOx traps and the SCR at temperatures above the maximum ammonia storage temperature of the SCR catalyst.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. The description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains.

Figure 1:
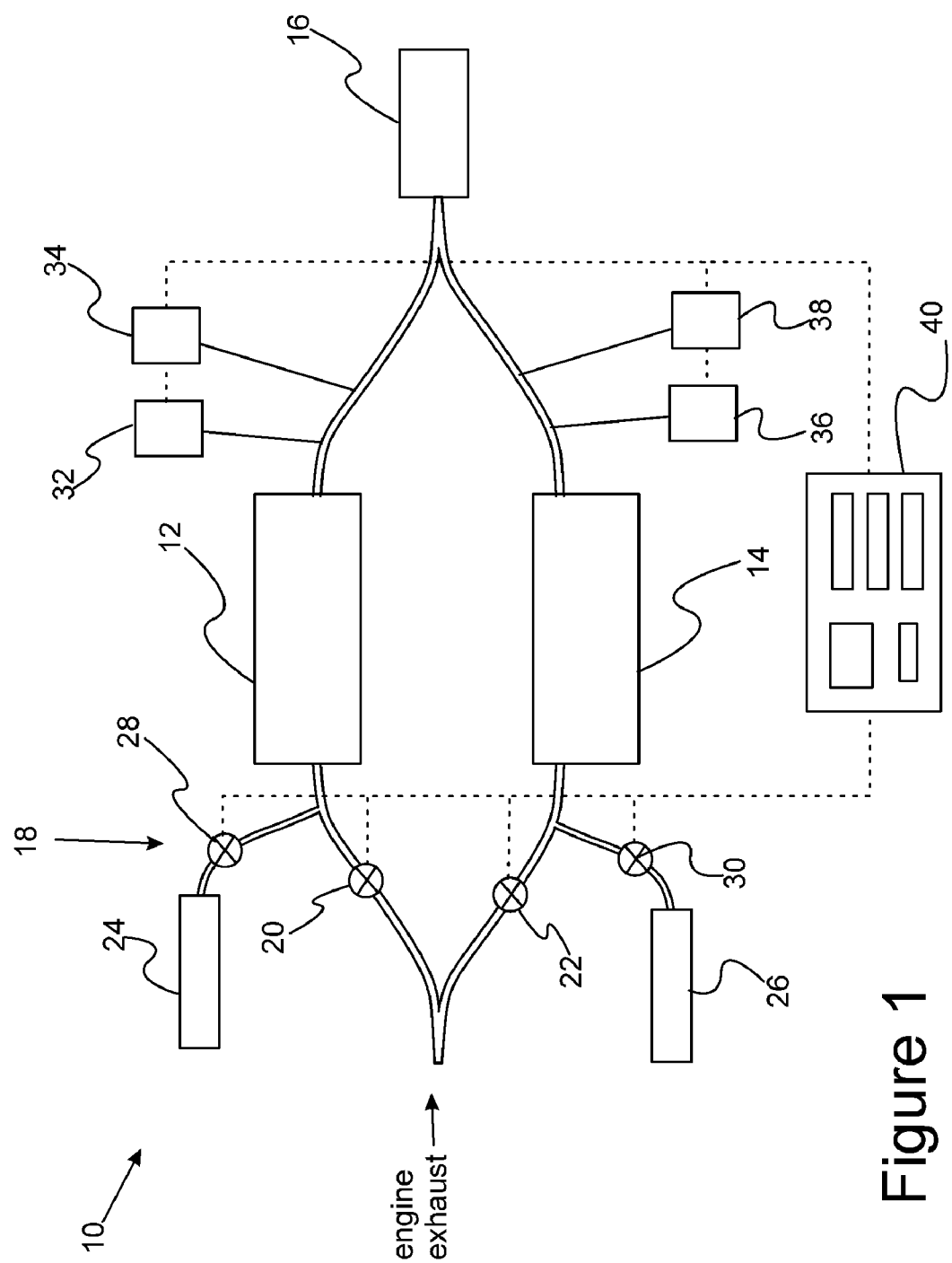
FIG. 1 is a schematic illustration of an exhaust system implementing an embodiment of the present invention for reducing NOx emissions.

With reference to FIG. 1, a schematic illustration of an embodiment of a diesel engine exhaust system for reducing NOx is provided. Exhaust system 10 includes first lean NOx trap 12, second lean NOx trap 14, and SCR catalyst 16. Valve system 18 allows flow through first lean NOx trap 12 while limiting flow through second NOx trap 14 and to allow flow through second lean NOx trap 14 while limiting flow through first NOx trap 12. Valve system 18 includes valve 20 which provides regulation of flow from an engine exhaust to lean NOx trap 12. Valve system 18 also includes valve 22 which provides regulation of flow from the engine exhaust to lean NOx trap 14. Exhaust system 10 also includes reductant sources 24, 26 for providing reductant (e.g., ammonia, carbon monoxide, molecular hydrogen, hydrocarbons) to lean NOx traps 12, 14. In a refinement, reductant sources 24, 26 are a reformer or a second engine as set forth below. Valve system 18 includes valves 28, 30 for regulating the flow of reductant to NOx traps 12, 14. Exhaust system 10 also includes gas monitors 32-38 for monitoring the amount of NOx slippage and NO levels emerging from NOx traps 12, 14. Controller 40 is in communication with valve system 18. Controller 40 is operable to implement the method of alternating exhaust and reductant flow to NOx traps 12, 14 as set forth below. Alternatively, a model could predict the control strategy based on engine operation (i.e., NOx concentration, flow, etc.)

The valved exhaust system of the present embodiment allows flow to be reduced to one of lean NOx traps 12, 14 thereby allowing that trap to be exposed to rich conditions for regeneration. Simultaneously, a lean flow is being supplied to a downstream SCR catalyst system 16. This lean flow could be directed through a parallel LNT system, or through an open pipe. In either configuration, during certain operating conditions downstream SCR catalyst system 16 will be supplied a mixture of $NH_3$-containing and lean NOx-containing streams producing a net lean (oxygen-containing) condition at the inlet to the SCR catalyst. Under these conditions, minimal $NH_3$ needs to be stored on the SCR catalyst to allow it to facilitate reaction of $NH_3$ and NOx resulting in NOx reduction to $N_2$ (nitrogen). This allows the SCR catalyst to contribute significantly to NOx reduction even when its temperature is much greater than 400° C.

An important feature of this design is that the overall LNT catalyst volume can be minimized. This is especially important since the LNT requires precious metals for its operation which contributes negatively to system cost. By maximizing the fraction of stored NOx which is converted to $NH_3$ and reacted with NOx over the SCR catalyst, the fraction of NOx which must be stored can be minimized. This in turn minimizes the quantity of LNT catalyst required to obtain a given level of NOx conversion.

Figure 2A:
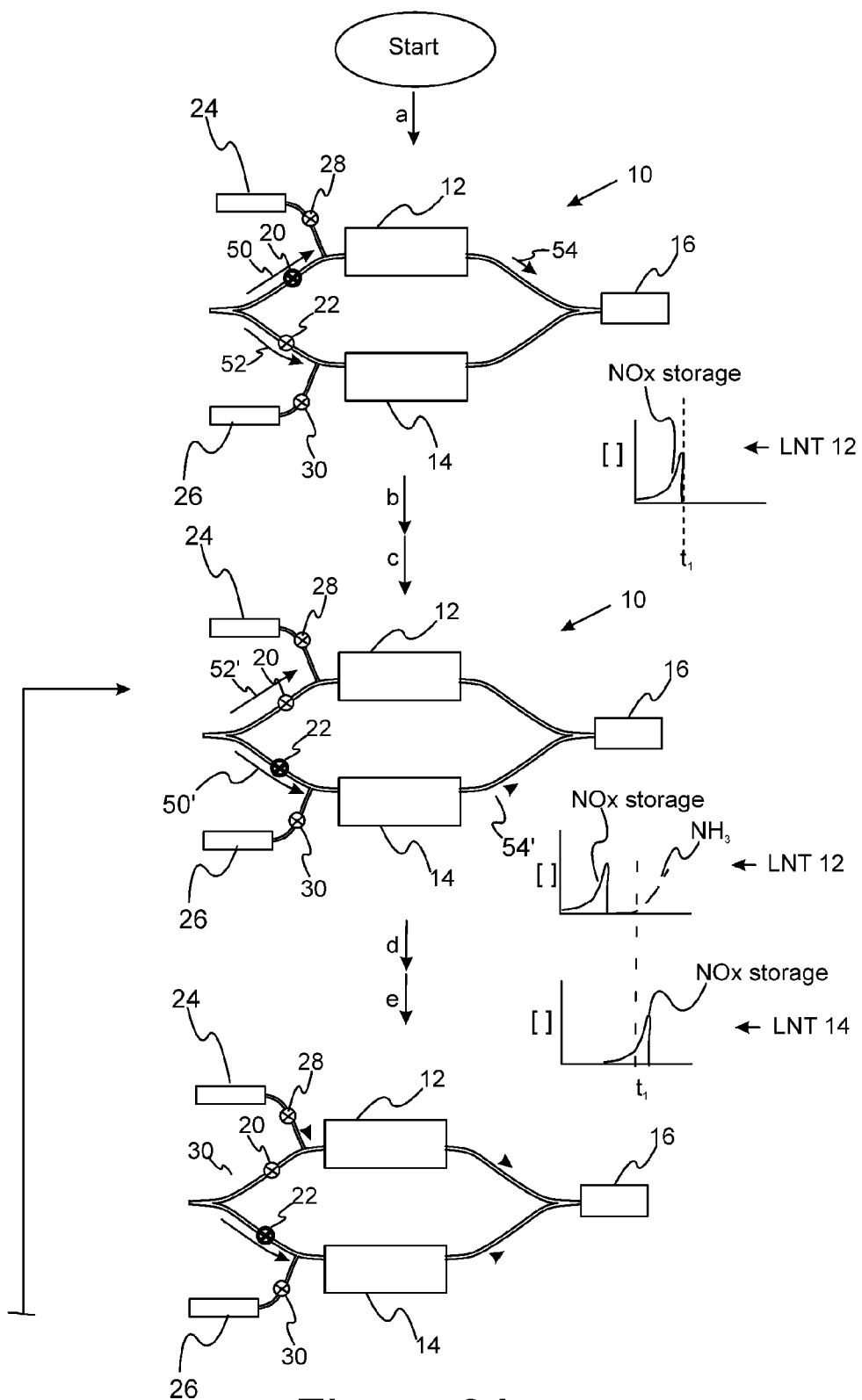
FIGS. 2A and 2B provides a schematic flowchart showing the operation of an exhaust system to reduce NOx emissions from an engine exhaust.
Figure 2B:
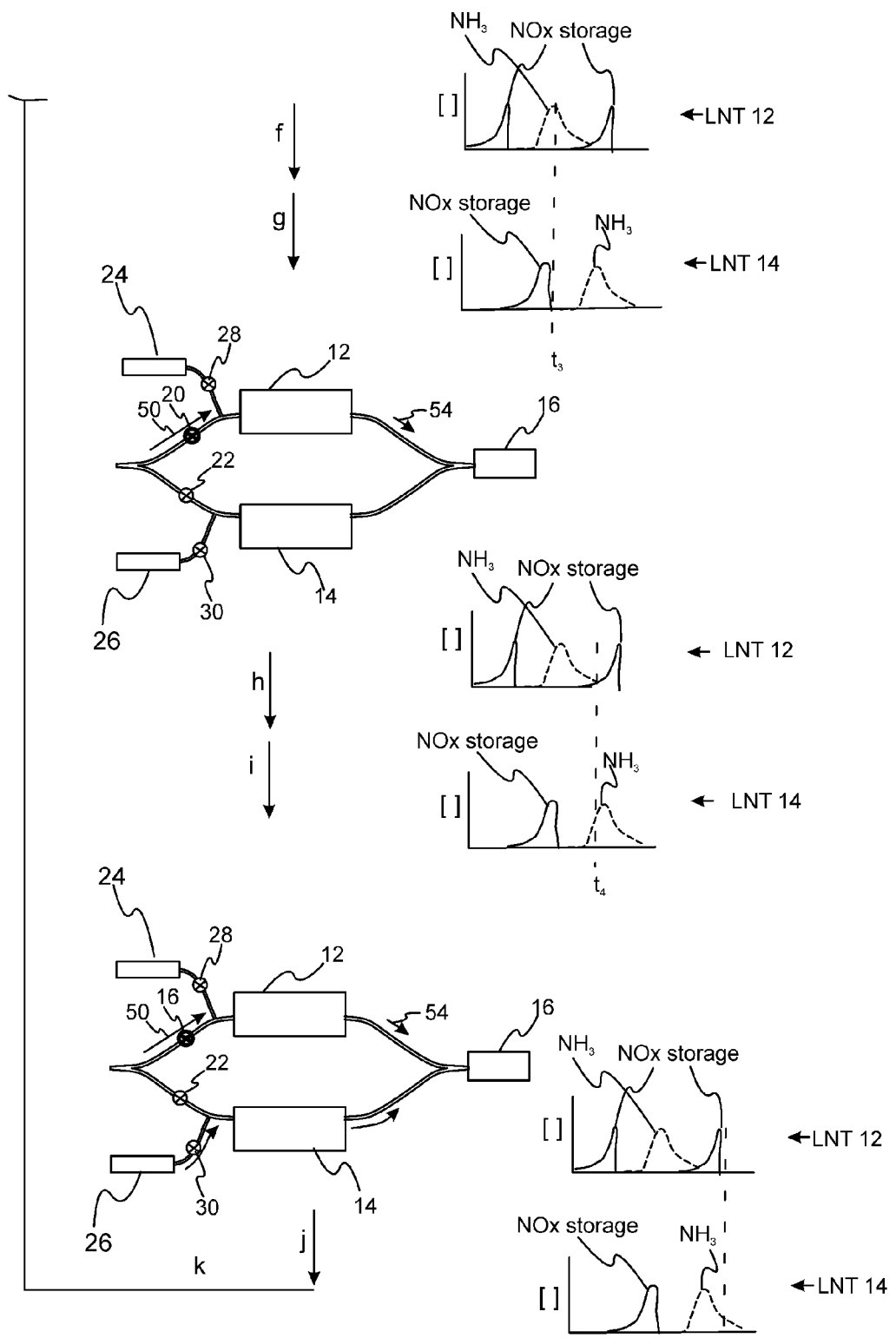

With reference to FIGS. 2A and 2B, a schematic flowchart showing the operation of exhaust system 10 to reduce NOx emissions from an engine exhaust is provided. In step a), valve 20 is opened while valve 22 is at least partially closed so that most of the flow 50 from an engine exhaust is flows through lean NOx trap 12. In a variation, a smaller portion of the flow represented by item number 52 flows through lean NOx trap 14. In another variation, valve 22 is completely closed. Exhaust stream 54 emerging from lean NOx trap 12 is directed through SCR catalyst system 16.

Still referring to FIGS. 2A and 2B, in step b), valve 22 is opened and valve 26 is at least partially closed so that most of flow 50' from the engine exhaust flows through lean NOx trap 14 with flow through lean NOx trap 12 being limited. In a variation, a smaller portion of the flow represented by item number 52' flows through lean NOx trap 12. In step c), the flow through first lean NOx trap 12 is limited at a time $t_1$ when NOx slippage through first lean NOx trap 12 is greater than a predetermined amount (i.e., a first predetermined slippage value). At this first predetermined slippage value, NOx storage substantially ceases as NOx trap 12 has reached its capacity. Flow through NOx trap 12 is limited by completely or partially closing valve 20. Exhaust stream 54' emerging from lean NOx trap 14 is directed through SCR catalyst system 16.

In step d), a reductant from reductant source 24 is provided to the lean NOx trap 12 in a sufficient amount to generate ammonia. The reductant is provided at time $t_2$ when the NOx slippage from the second NOx trap is greater than a second predetermined slippage value. In step e), the ammonia from step d) is directed to SCR catalyst system 16. Characteristically, the generated ammonia and the exhaust emerging from the second lean NOx trap 14 contact SCR catalyst system 16 substantially contemporaneously.

In step f), the lean exhaust is flowed through the first lean NOx trap 12 at time $t_3$. At time $t_3$, ammonia generation from the first lean NOx trap has fallen below a first predetermined ammonia level. Exhaust emerging from first lean NOx trap 12 again flows through SCR catalyst system 16. In step g), the exhaust flow through second lean NOx trap 14 is limited. In a refinement, the exhaust flow through lean NOx trap 14 is limited by completely or partially closing valve 22.

Still referring to FIG. 2A and 2b, in step h), a reductant from reductant source 26 is provided to second lean NOx trap 14 at time $t_4$ in a sufficient amount to generate ammonia from second lean NOx trap 14. The reductant is provided when the NOx slippage from the first NOx trap is greater than a third predetermined slippage value. In step i), the generated ammonia from step h) is directed to the SCR catalyst system 16 such that the ammonia and the exhaust emerging from first lean NOx trap 12 in step f) contacts SCR catalyst system 16 substantially contemporaneously.

Finally, in a variation of the present embodiment, steps b)-i) are repeated a plurality of times. This repetition is accomplished via steps j) and k), which loops back to the state of the exhaust system as it exists after step c). In particular, in step j), the lean exhaust is flowed through the second lean NOx trap 14 at time $t_5$. At time $t_5$, ammonia generation from the second lean NOx trap 14 has fallen below a fourth predetermined ammonia level. Exhaust emerging from second lean NOx trap 14 again flows through SCR catalyst system 16. In step k), the exhaust flow through first lean NOx trap 12 is limited. In a refinement, the exhaust flow through first lean NOx trap 12 is limited by completely or partially closing valve 20.

As set forth above, reductants are provided to lean NOx traps 12, 14. Such reductants may be liquid reductants or a gaseous reductants. In one refinement, the reductant is a liquid reductant selected from the group consisting of hydrocarbon compounds, diesel fuel, an ammonia precursor (i.e, urea solution), gasoline, and combinations thereof. In another refinement, the reductant is a gaseous reductant selected from the group consisting of hydrocarbon compounds, hydrogen gas, carbon monoxide, ammonia, and combinations thereof. In still another refinement, the reductant is derived from a reformer. An example of a useful reformer includes, but is no limited to, a second engine operating within the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of reducing NOx emissions from an engine exhaust, the method comprising:
   a) flowing a lean exhaust through a first lean NOx trap such that exhaust emerging from the first lean NOx trap flows through an SCR catalyst system;
   b) flowing the lean exhaust through a second lean NOx trap such that exhaust emerging from the second lean NOx trap flows through the SCR catalyst system;
   c) limiting the flow through the first lean NOx trap when NOx slippage through the first lean NOx trap is greater than a first predetermined slippage value;
   d) providing a reductant to the first lean NOx trap in a sufficient amount to generate ammonia from the first lean NOx trap when NOx slippage from the second NOx trap is greater than a second predetermined slippage value; and
   e) directing the ammonia from step d) to the SCR catalyst system wherein the ammonia and the exhaust emerging from the second lean NOx trap in step b) contact the SCR catalyst system substantially contemporaneously.

2. The method of claim 1 further comprising:
   f) flowing the lean exhaust through the first lean NOx trap when ammonia generation from the first lean NOx trap falls below a first predetermined ammonia level such that exhaust emerging from the first lean NOx trap flows through the SCR catalyst system;
   g) limiting the flow through the second lean NOx trap;
   h) providing the reductant to the second lean NOx trap in a sufficient amount to generate ammonia from the second lean NOx trap when the NOx slippage from the first NOx trap is greater than the second predetermined slippage value; and
   i) directing the ammonia from step h) to the SCR catalyst system wherein the ammonia and the exhaust emerging from the first lean NOx trap in step f) contact the SCR catalyst system contemporaneously.

3. The method of claim 2 wherein steps b)-i) are repeated a plurality of times.

4. The method of claim 2 wherein lean exhaust flow is completely shut off in steps c) and g).

5. The method of claim 1 wherein the reductant is a liquid reductant or a gaseous reductant.

6. The method of claim 5 wherein the reductant is a liquid reductant selected from the group consisting of hydrocarbon compounds, diesel fuel, gasoline, an ammonia precursor, and combinations thereof.

7. The method of claim 5 wherein the reductant is a gaseous reductant selected from the group consisting of hydrocarbon compounds, hydrogen gas, carbon monoxide, ammonia and combinations thereof.

8. The method of claim 5 wherein the reductant is derived from a reformer.

9. The method of claim 8 wherein the reformer includes a second engine.

10. A method of reducing NOx emissions from an engine exhaust, the method comprising:
    a) flowing a lean exhaust through a first lean NOx trap such that exhaust emerging from the first lean NOx trap flows through an SCR catalyst system;
    b) flowing the lean exhaust through a second lean NOx trap such that exhaust emerging from the second lean NOx trap flows through the SCR catalyst system;
    c) limiting the flow through the first lean NOx trap when NOx slippage through the first lean NOx trap is greater than a first predetermined slippage value;
    d) providing a liquid or gaseous reductant to the first lean NOx trap in a sufficient amount to generate ammonia from the first lean NOx trap when the NOx slippage from the second NOx trap is greater than a second predetermined slippage value;
    e) directing the ammonia from step d) to the SCR catalyst system wherein the ammonia and the exhaust emerging from the second lean NOx trap in step b) contact the SCR catalyst system substantially contemporaneously;
    f) flowing the lean exhaust through the first lean NOx trap when ammonia generation from the first lean NOx trap falls below a first predetermined ammonia level such that exhaust emerging from the first lean NOx trap flows through the SCR catalyst system;
    g) limiting the flow through the second lean NOx trap;
    h) providing the liquid or gaseous reductant to the second lean NOx trap in a sufficient amount to generate ammonia from the second lean NOx trap when the NOx slippage from the first NOx trap is greater than the second predetermined slippage value;
    i) directing the ammonia from step h) to the SCR catalyst system wherein the ammonia and the exhaust emerging from the first lean NOx trap in step f) contact the SCR catalyst system contemporaneously; and
    j) repeating steps b)-i) a plurality of times.

11. The method of claim 10 wherein lean exhaust flow is completely shut off in steps c) and g.

12. The method of claim 10 wherein the reductant is a liquid reductant selected from the group consisting of hydrocarbon compounds, diesel fuel, gasoline, and combinations thereof.

13. The method of claim 10 wherein the reductant is a gaseous reductant selected from the group consisting of hydrocarbon compounds, hydrogen gas, carbon monoxide, ammonia, and combinations thereof.

14. The method of claim 10 wherein the reductant is derived from a reformer.

15. The method of claim 14 wherein the reformer includes a second engine.

16. An exhaust system comprising:
- a first lean NOx trap adapted to receive lean exhaust from an internal combustion engine;
- a second lean NOx trap adapted to receive lean exhaust from the internal combustion engine;
- a valving system adapted to allow flow through the first lean NOx trap while limiting flow through the second NOx trap and to allow flow through the second lean NOx trap while limiting flow through the first NOx trap;
- a reductant source;
- a SCR system located downstream of the first and second lean NOx traps, the SCR system in fluid communication with the first and second lean NOx traps; and
- a controller operating the valving system to:
  a) flow a lean exhaust through the first lean NOx trap such that exhaust emerging from the first lean NOx trap flows through an SCR catalyst system;
  b) flow the lean exhaust through the second lean NOx trap such that exhaust emerging from the second lean NOx trap flows through the SCR catalyst system;
  c) limit the flow through the first lean NOx trap when NOx slippage through the first lean NOx trap is greater than a first predetermined slippage value;
  d) provide a reductant to the first lean NOx trap in a sufficient amount to generate ammonia from the first lean NOx trap when NOx slippage from the second NOx trap is greater than a second predetermined slippage value; and
  e) direct the ammonia from step d) to the SCR catalyst system wherein the ammonia and the exhaust emerging from the second lean NOx trap in step b) contact the SCR catalyst system substantially contemporaneously.

* * * * *